United States Patent [19]

Lucas et al.

[11] Patent Number: 5,553,360
[45] Date of Patent: Sep. 10, 1996

[54] EXTENDED WEDGE SOCKET ASSEMBLY

[75] Inventors: Charles E. Lucas, Tulsa, Okla.;
Douglas E. Wilson, LaMesa, Calif.

[73] Assignee: The Crosby Group, Inc., Tulsa, Okla.

[21] Appl. No.: 446,537

[22] Filed: May 19, 1995

[51] Int. Cl.⁶ .................................................. F16G 11/00
[52] U.S. Cl. .................... 24/136 K; 24/115 M; 24/136 R; 403/211
[58] Field of Search .............................. 24/136 K, 136 A, 24/136 B, 136 R, 136 L, 115 M; 403/211, 213

[56] References Cited

U.S. PATENT DOCUMENTS

| Re. 32,847 | 1/1989 | Briscoe et al. . | |
|---|---|---|---|
| 3,240,526 | 3/1966 | Schopf et .................................. | 403/213 |
| 3,335,470 | 8/1967 | Baer ......................................... | 403/211 |
| 3,681,808 | 8/1972 | Hahn et al. . | |
| 3,816,012 | 6/1974 | Hubbell . | |
| 3,905,711 | 9/1975 | Rogers ..................................... | 24/115 M |
| 4,411,132 | 10/1983 | Crook, Jr. . | |
| 4,561,154 | 12/1985 | Briscoe et al. . | |
| 4,602,891 | 7/1986 | McBride . | |
| 4,714,238 | 12/1987 | Spradley et al. . | |
| 4,718,788 | 1/1988 | Briscoe .................................... | 24/136 R |
| 4,845,814 | 7/1989 | Crook . | |
| 5,199,137 | 4/1993 | Edwards .................................. | 24/136 K |

*Primary Examiner*—Victor N. Sakran
*Attorney, Agent, or Firm*—Head, Johnson & Kachigian

[57] ABSTRACT

A wedge socket assembly having a wedge socket, a pin for connecting objects to the wedge socket, a wedge, and a bolt for holding the wedge in the wedge socket. The wedge socket has an elongated, hollow basket of substantially rectangular cross-section. The hollow basket has a large opening at a first end, a small opening at a second end, and an interior cross-section tapering from said large opening to said small opening. Connected to the basket are a pair of jaws extending from opposite sides of the first end, and the jaws each have an opening therethrough aligned with one another, with the pin inserted through the openings and retained by a cotter pin. The wedge has a first wedge portion with a large end and a small end, and is of substantially the same shape as the interior of the basket. An extended portion is connected to the small end of the first wedge portion and has an opening therethrough, and is sized such that when the wedge is positioned within the basket the extended portion extends through the small opening. The bolt is inserted into the opening in the extended portion, and is retained in the opening by a nut. In an alternate embodiment, a forged wire rope clip connects a wire rope to the extended wedge portion through the opening.

4 Claims, 3 Drawing Sheets

EXTENDED WEDGE SOCKET ASSEMBLY

BACKGROUND OF THE INVENTION

1. Field of the Invention

This invention relates to a wedge socket and wedge connector for coupling a wire rope to an object. More specifically, this invention relates to an improved wedge socket and wedge that prevents the wedge from disengaging the wedge socket.

2. Description of the Invention Background

When lifting, moving or pulling objects by use of a crane, hoist or other powered machinery, for example on a construction site, a wire rope is commonly used to transfer movement from the power source to the object to be moved. One end of the wire rope is typically attached to a power source, such as a vehicle, or to a mechanism such as a spool which is connected to the power source. Wire rope as commonly used on a crane, for instance, runs from the spool where it is wound, up an arm and over a pulley, where it hangs down to be used for various lifting, moving, pulling or other construction purposes.

At the free end of the wire rope, it is necessary to attach in some manner the wire rope to the object to be lifted. One mechanism used to attach the wire rope to the object is a wedge socket assembly. The object is then attached to the wedge socket assembly, either directly via a jaw and pin formed integrally into the wedge socket assembly or via a block, hook or other mechanism attached to the jaw and pin of the wedge socket assembly. Common applications for a wedge socket assembly include high dynamic uses such as pile drivers, drag lines, clamshell operations, and the like, and more static uses such as mining applications, elevator applications, and the like.

The wedge socket assembly typically comprises a wedge socket and a wedge which fits into the wedge socket. The wedge socket comprises a hollow elongated basket of substantially rectangular cross-section which is open at both ends. The inside of the basket of the wedge socket is tapered from one opening to the other, so that one opening is smaller than the other. The wedge is similarly shaped as the interior of the basket of the wedge socket —i.e. it is tapered, is of substantially rectangular cross-section, and is substantially the same size as the interior of the basket. The wedge typically will have a groove which runs around its longest circumference. The groove is typically of similar diameter as the wire rope with which it is to be used.

The wire rope is attached to the wedge socket assembly by running it through the hollow basket of the wedge socket from the smaller opening to the larger opening, positioning the wire rope in the groove around the circumference of the wedge, and running the wire rope back through the hollow basket of the wedge socket from the larger opening to the smaller opening. The wedge with the wire rope around it is then inserted into the basket of the wedge socket, trapping the wire rope between the edge of the wedge and the interior sides of the basket. The taper of the wedge and the taper of the inside of the basket of the wedge socket combine so that when tension is put on the wire rope, the wedge is pulled by the wire rope tightly into the basket, retaining the wedge and wire rope firmly in place. A forged wire rope clip is then attached to the tail, or dead end, of the wire rope.

A pair of jaws are cast integral to the wedge socket on the side of the wedge socket away from the side where the wire rope enters. A pin is inserted through a pair of coaxial holes formed transversely through the jaws of the wedge socket and is held in place with a cotter pin. The object to be moved or lifted, such as a clamshell bucket, can then be connected directly to the wedge socket by passing the pin through a hole in a tab formed in the object designed for that purpose. Alternately, a block, hook or some other holding means can be connected to the wedge socket by the pin, and an object can be connected to the holding means.

During a typical operation, the wedge and wire rope are forced into the wedge socket with enough force that the wedge will remain in place. However, a reverse force on the wedge socket assembly could generate slack in the wire rope running around the wedge and the wedge can be jarred loose from its engaged position in the wedge socket.

In certain high dynamic applications, such as pile driving, clamshell operations, or the like, the object attached to the wire rope stops suddenly, such as, for instance, in pile driving, when the driver impacts the pile. Upon impact, the wedge socket assembly stops suddenly as well. However, the wire rope wants to continue moving, and its momentum will redistribute itself because it can no longer move forward. The wire rope, being fairly stiff, will build up a substantial column of force before buckling. This column of force will travel linearly in the direction of movement until the wire rope buckles. The column of force is applied directly into and against the wedge socket assembly and can unseat, or punch out, the wedge from within the basket of the wedge socket.

Similarly, in other high dynamic applications, such as drag line operations and the like, the power source may stop suddenly, thus stopping the wire rope equally as suddenly. In this situation, the object being moved wants to keep moving, and thus the object will push the wedge socket assembly directly into the wire rope. Again, the wire rope will create a column of resistance before buckling, which may cause the wedge to punch out from the wedge socket.

If the wedge punches out of the basket of the wedge socket, the wire rope may jump or fall out of the groove around the circumference of the wedge. The wedge itself may then become lodged between the ears or between the basket and the ears of the wedge socket, or cocked at an angle in the basket, with the wire rope pinned between an edge of the wedge and a portion of the basket. When further weight or tension is applied to the wire rope, the wedge and socket can cut or weaken the pinned rope.

One method of preventing the wedge from becoming disengaged from the wedge socket is to use a forged wire rope clip to attach the wire rope tail to the portion of the wire rope under tension, or live end. This method has the disadvantage that with every impact the wire rope will slide minutely around the wedge to reseat itself, which will cause the forces to distribute themselves such that all of the weight of the object being lifted may be placed on the forged wire rope clip, creating an eccentric load. The efficiency of the eccentric load is only about sixty percent.

It is thus seen that there is a need for a wedge socket which overcomes these shortcomings.

SUMMARY OF THE INVENTION

In view of the disadvantage of known wedge sockets and wedges, a wedge socket assembly has been invented wherein the wedge is prevented from disengaging the wedge socket, no matter how much slack occurs in the wire rope.

The present invention comprises a wedge socket assembly which comprises a wedge socket, a pin for holding objects to the wedge socket, a wedge, and a bolt for holding the wedge in the wedge socket. The wedge socket has an elongated, hollow basket of substantially rectangular cross-section. The hollow basket has a large opening at a first end, a small opening at a second end, and an interior cross-section tapering from the large opening to the small opening. Connected to the basket are a pair of jaws extending from opposite sides of the first end; the jaws each have an opening therethrough aligned with one another. A pin is inserted through the jaw openings and retained by a cotter pin. The wedge has a first wedge portion with a large end and a small end, and is of substantially the same shape as the interior of the basket. An extended portion is connected to the small end of the first wedge portion and has an opening therethrough, and is sized such that when the wedge is positioned within the basket the extended portion extends through the small opening. A bolt or pin is inserted through the opening in the extended portion, and is retained by a nut or a retaining clip in the opening in the extended portion.

In an alternate embodiment, a forged wire rope clip connects a wire rope to the extended wedge portion.

It is an advantage of this invention to have a wedge socket which will prevent the wedge from falling out of the wedge socket when the wedge is jarred loose and there is slack in the wire rope. These and other advantages and benefits will become apparent from the Detailed Description of the Invention hereinbelow.

BRIEF DESCRIPTION OF THE DRAWINGS

For the present invention to be clearly understood and readily practiced, preferred embodiments will now be described in which.

DETAILED DESCRIPTION OF THE INVENTION

Figure 1:
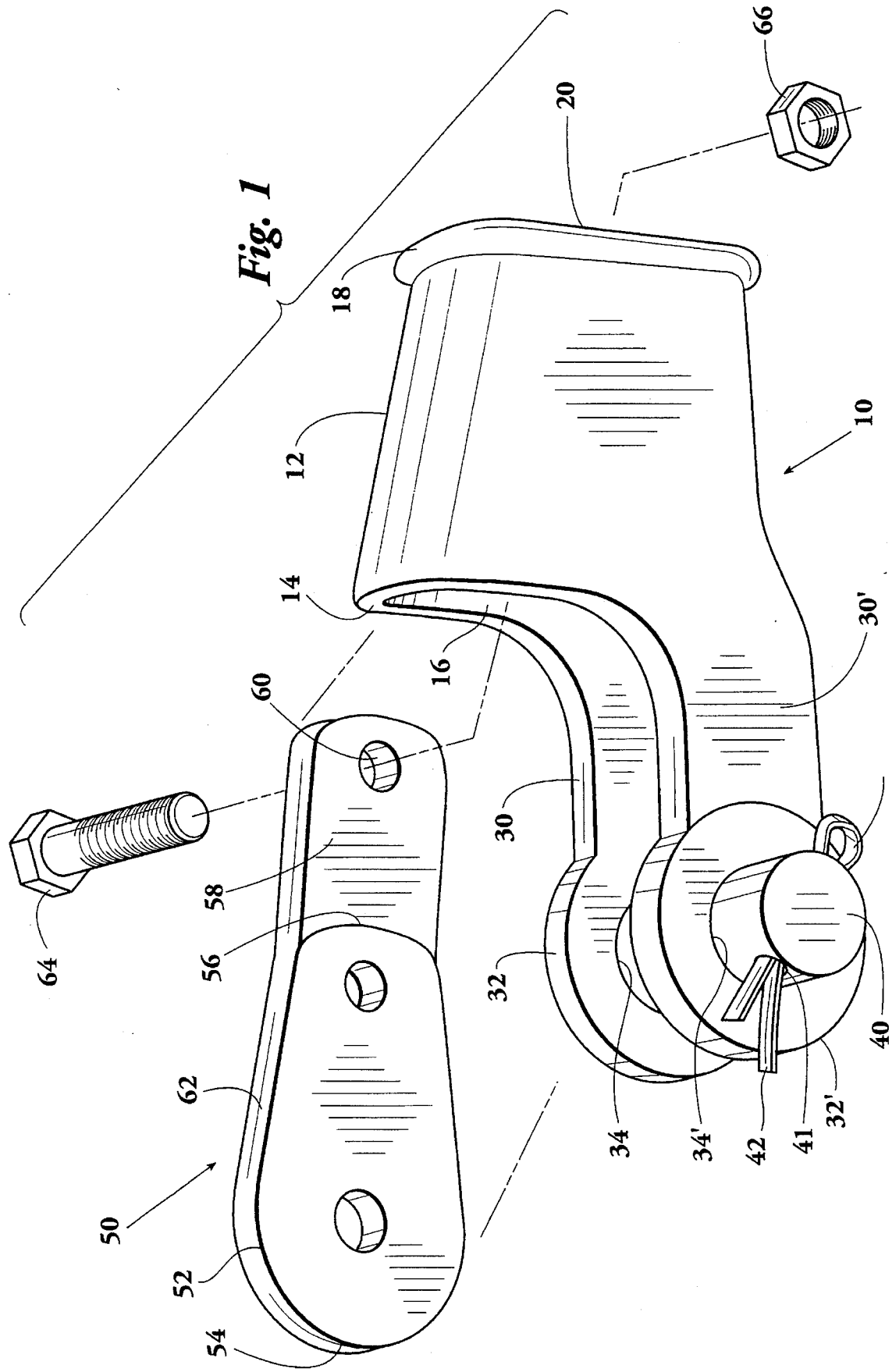
FIG. 1 is an elevational view of the wedge socket assembly in an unassembled configuration.

FIG. 1 shows an elevational view of a wedge socket assembly 9 comprising a wedge socket 10, a first pin 40, a wedge 50 and a bolt or second pin 64. The wedge socket 10 is comprised of a hollow elongated basket 12 which has a substantially rectangular cross-sectional shape. The basket 12 has a first end 14 with a large opening 16 and a second end 18 with a small opening 20. The interior of the basket 12 tapers in cross-sectional area from the large opening 16 to the small opening 20. Extending from opposite sides of the opening 16 at the first end 14 are a pair of jaws 30 and 30'. The jaws 30 and 30' are shown cast integrally to the basket 12, but may be connected by means such as bolts or welds. The jaws 30 and 30' have ends 32 and 32', respectively, which have coaxial holes 34 and 34', respectively, formed transverse to the jaws 30 and 30'. The first pin 40 extends through the holes 34 and 34' and is held in place with a cotter pin 42, which is inserted through a hole 41 in the pin 40.

The wedge 50 is comprised of a first wedge portion 52 which is of substantially the same cross-section as the interior cross-section of the basket 12 of the wedge socket 10. The first wedge portion 52 has a large end 54 and tapers down to a narrow end 56. An extended portion 58 extends from the narrow end 56 of the first wedge portion 52. The extended portion 58 has an opening in the form of a hole 60 therethrough, and in the present embodiment is not tapered, although the extended portion 58 may be tapered or be otherwise configured. The wedge 52 has a groove 62 which runs around its longest circumference. The groove 62 is of approximately the same diameter as the wire rope to be used with the wedge socket 10 and the wedge 50. The bolt 64 is inserted through the opening 60 in the extended portion 58 of the wedge socket 50, and a nut 66 is threaded onto the bolt 64. In the present embodiment, the wedge socket 10 and the wedge 50 are cast in steel, but may be formed by other means and of other materials as is known in the art.

Figure 2:
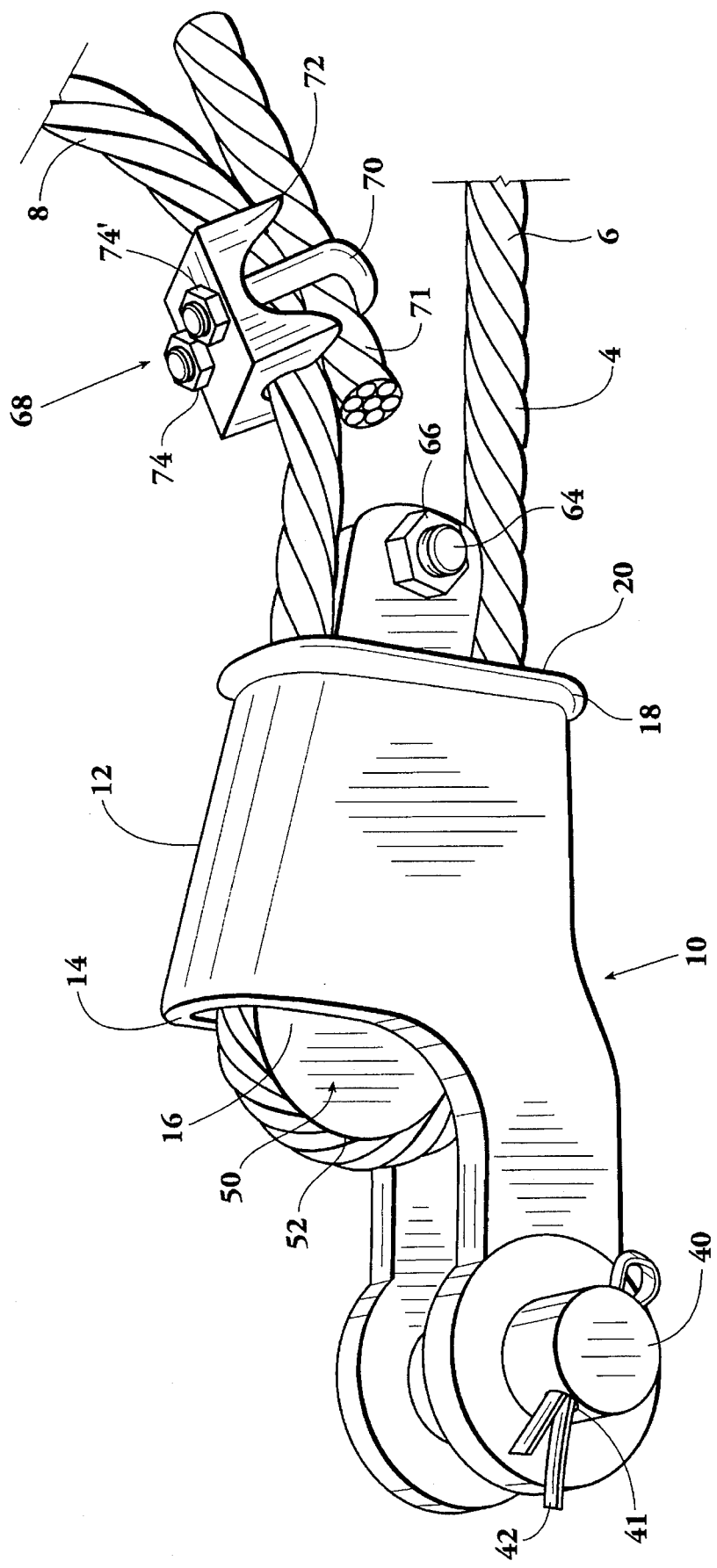
FIG. 2 is an elevational view of the wedge socket assembly in assembled configuration with a wire rope.

FIG. 2 shows the wedge socket 10 and the wedge 50 in an assembled configuration with a wire rope 4. The wire rope 4 has a live end 6 attached to a power source (not shown) and a dead end 8. When assembled, the live end 6 of the wire rope 4 runs into the small opening 20 at the second end 18 of the basket 12 of the wedge socket 10. The wire rope 4 then runs around the first wedge portion 52 of the wedge 50 in the circumferential groove 62 (FIG. 1), passing out of and then back into the large opening 16 of the first end 14, and then passes back out through the small opening 20 of the second end 18. The wedge 50, with the wire rope 4 wrapped around it, is inserted into the basket 12 of the wedge socket 10 such that the first wedge portion 52 and the wire rope 4 are wedged snugly in the interior of the basket 12 and the extended portion 58 of the wedge 50 extends through the small opening 20 of the second end 18 of the basket 12. The bolt 64 is inserted through the opening 60 (FIG. 1) in the extended portion 58 of the wedge socket 50, and the nut 66 is threaded onto the bolt 64. Other wedge retaining means, such as a pin and cotter pin or a pull pin with a ball, are well-known in the art and can also be utilized. A forged wire rope clip 68 comprised of a U-bolt 70, a base 72 and a pair of nuts 74 and 74' is connected to the dead end 8 of the wire rope 4. The U-bolt 70 of the clip 68 is placed around the dead end 8 and a small wire rope spacer piece 71 and interlocks with the base 72. The pair of nuts 74 and 74' are threaded onto the U-bolt 70, clamping the clip 68 firmly to the dead end 8 and the spacer piece 71.

In operation, the live end 6 of the wire rope 4 is connected to a hoist, crane, vehicle or other power source. To connect the wire rope 4 to the wedge socket assembly 9, the wire rope 4 is threaded through the basket 12, around the wedge 50, and back through the basket 12 as described above. The wedge 50 and the wire rope 4 together are inserted into the basket 12 such that the extended portion 58 of the wedge 50 extends through the small opening 20 of the second end 18 of the basket 12. The bolt 64 through the hole 60 of the wedge 50 prevents the wedge 50 and the wire rope 4 from disengaging the interior of the basket 12. The nut 66 prevents the bolt 64 from falling out from impact.

An object, such as the driver of a pile driver or the like, is connected to the wedge 10 via the pin 40. The object to be lifted typically will have a tab with a hole therein (not shown). The tab on the object to be lifted can be placed between the ears 30 and 30' with the hole axially aligned with the holes 34 and 34'. The pin 40 then can be inserted through the hole 34, through the hole in the object, and through the hole 34'. The cotter pin 42 can be inserted through the hole 41 in the pin 40. Other pin means or methods of attaching the object to the wedge socket 12, such as a bolt and a nut, are well known in the art, and can also be utilized.

To properly seat the wedge 50 and the wire rope 4 into the wedge socket 10, a weight or static load equal to the amount of load is connected via the pin 40 to the wedge socket 12 and is picked up. This is called pre-loading the wedge socket assembly. This will firmly lodge the wedge 50 into the basket 12 and trap the wire rope 4 between the circumferential groove 62 around the wedge portion 54 and the inner walls of the basket 12. Another method of seating the wedge 50 and the wire rope 4 into the wedge socket 10 is to bang the wedge 50, with the wire rope 4 around it, repeatedly with a hammer to force them firmly into the wedge socket 10.

In certain high-dynamic applications, such as pile drivers, clamshell operations and the like, the object connected to wedge socket assembly will stop suddenly. Therefore, the wedge socket assembly 9 itself will stop suddenly. In such a situation, the wire rope 4 will tend to retain its momentum, thus creating a column of force moving in the direction of travel, which is leftward in FIG. 2. This column of force will push on the wedge socket assembly 9 until the force is great enough to buckle the wire rope 4. This pre-buckling column of force will operate to push on the wedge 50, and will try to push the wedge 50 out from its seating in the basket 12. This is called "punch out". The bolt 64 inserted through hole the 60 of the wedge 50 prevents the wedge 50 from becoming unseated from the basket 12.

Similarly, in other high-dynamic applications, such as drag lines, the power source will stop suddenly, thus the wire rope 4 will stop suddenly. In this situation, the wedge socket assembly 9 will push on the wire rope 4. Again, were it not for bolt 64, this force could operate to punch out the wedge 50 from its seating in the basket 12 before the wire rope 4 buckles.

In a typical operation, motion is stopped and started numerous times. With each stop and start, the wedge 50 is jostled within the basket 12. The wire rope 4 and the wedge 50 will reseat themselves within the basket 12 with each impact. In reseating themselves, the dead end 8 slides back and forth minutely into and out of the basket 12 and around the wedge 50, to adjust itself to the tensions being applied. This creates the possibility that the dead end 8 could slip through the basket 12. Therefore, the forged wire rope clip 68 is attached to the dead end 8 to prevent the dead end 8 from slipping back into the basket 12.

Figure 3:
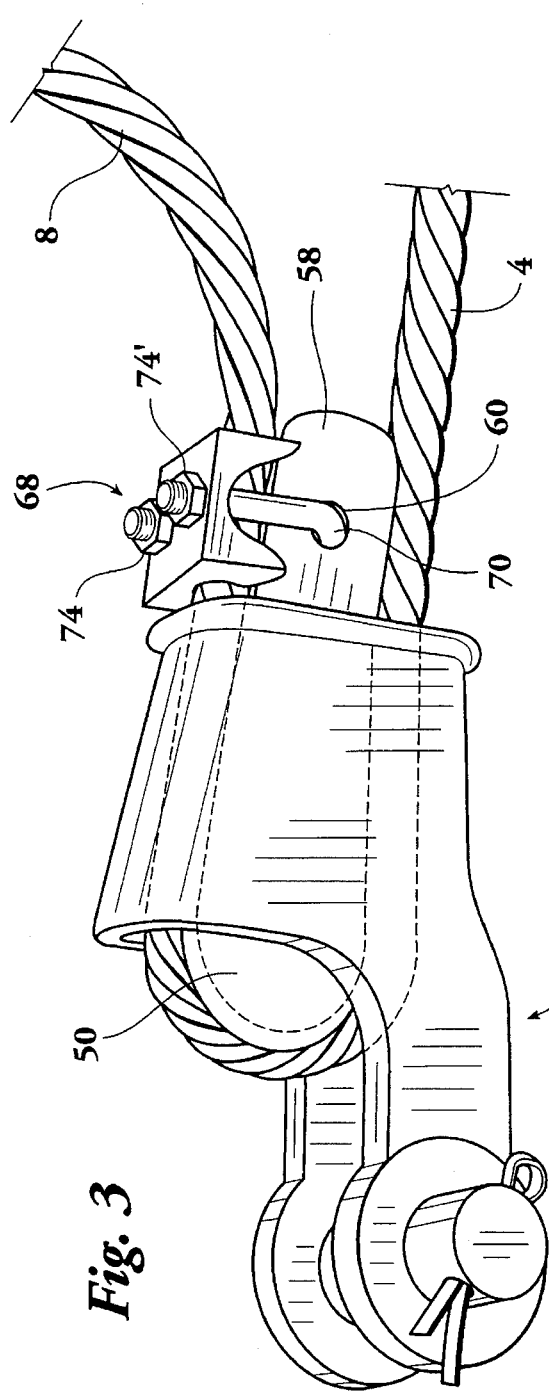
FIG. 3 is an elevational view of an alternate embodiment of the wedge socket assembly in assembled configuration with a wire rope.
Figure 4:
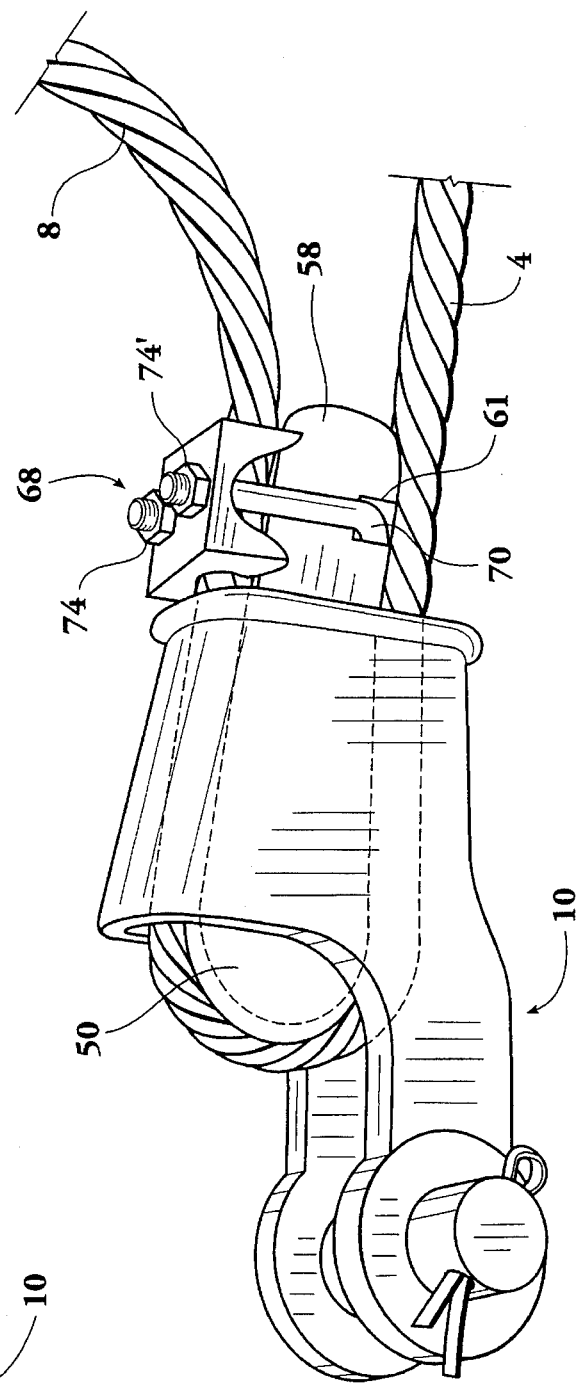
FIG. 4 is an elevational view of another alternate embodiment of the wedge socket assembly in assembled configuration with a wire rope.

Alternate embodiments of the wedge socket assembly 9 with a wire rope 4 are pictured in FIGS. 3 and 4. FIG. 3 shows a wedge socket 10 and a wedge 50 of similar configuration to the above-described embodiment. In this alternate embodiment, however, the dead end 8 of the wire rope 4 is attached to the extended portion 58 by clipping the forged wire rope clip 68 through the hole 60. The U-bolt 70 is thread through the hole 60. The base 72 is placed around the dead end 8 and coupled to the U-bolt 70. The nuts 74 and 74' are attached to the U-bolt 70 and tightened, sandwiching the dead end 8 in between the base 72 and the extended portion 58 of the wedge 50. The extended portion 58 of wedge 50 in this alternate embodiment may be elongated to aid attachment of the dead end 8 of the wire rope 4 to the extended portion 58.

FIG. 4 shows a wedge socket 10 and a wedge 50 of similar configuration to the embodiment shown in FIG. 3. However, in this alternate embodiment, the extended portion 58 of the wedge 50 includes an opening in the form of a notch 61 in an edge 63, as opposed to a hole 60 as shown in FIG. 3. The dead end 8 of the wire rope 4 is attached to the extended portion 58 of the wedge 50 by clipping the forged wire rope clip 68 through the notch 61. The U-bolt 70 is threaded through the notch 61. The base 72 is placed around the dead end 8 and coupled to the U-bolt 70. The nuts 74 and 74' are attached to the U-bolt 70 and tightened, sandwiching the dead end 8 in between the base 72 and the extended portion 58 of the wedge 50. The notch 61 in the edge 63 may be deeper than, shallower than, or of the same depth as the width of the U-bolt 70. The extended portion 58 of wedge 50 in this alternate embodiment may be elongated to aid attachment of the dead end 8 of the wire rope 4 to the extended portion 58.

The present invention also may be used in different applications such as mining applications or elevator applications wherein the dynamics of the forces on the wedge socket assembly are different than in pile driving, drag lines, clamshell operation or the like. In mining and elevator applications, there is a straight tension load on the wedge socket assembly, and thus there is typically no occasion for the wedge to become disengaged from the wedge socket. The present wedge socket with the keeper can be used as redundant securement of the wire rope to the wedge socket.

Another typical use for the wedge socket is for attaching an overhaul ball, which is a large ball that is attached to the wire rope to weight the line to overcome the friction and weight in the system so that the rope will fall. Again, the force on the overhaul ball is typically a straight tension load, but the present invention can be used to provide redundant securement of the wire rope to the wedge socket.

As with prior art wedge socket assemblies, the present wedge socket assembly can be manufactured in various sizes to be used with different sizes of wire rope. Standard sizes of wire rope run from ⅜" through 1-¼, and larger sizes are available. Typical XIP grade wire rope is rated at 7 tons for ⅜" wire rope up to 80 tons for 1-¼" wire rope. When using a wedge socket assembly, wire rope is 80% efficient, meaning that the wire rope's breaking point is 80% of normal catalog strength. The wedge socket assembly itself is much stronger than the wire rope. The working load when using wire rope is generally ⅕ to ⅓ of the catalog strength, or of 80% of the catalog strength when using a wedge socket assembly. Thus, typical maximum working loads when using a wedge socket assembly run from approximately 2 tons for ⅜" wire rope up to approximately 20 tons for 1-¼" wire rope.

While in the foregoing specification detailed descriptions of particular embodiments of the invention have been set down for the purposes of illustration, many variations in the details herein given may be made by those skilled in the art without departing from the spirit and scope of the invention.

What is claimed is:

1. A wedge socket assembly, comprising:
    a wedge socket having,
        an elongated, longitudinal hollow basket having a large opening at a first end, a small opening at a second end, and an interior cross-section tapering from said large opening to said small opening, and
        a pair of jaws connected to said basket and extending from opposite side of said first end, said jaws each having a transverse opening therethrough, said openings being aligned with one another;
        first pin means for insertion through said pair of openings, and first retaining means for retaining said first pin means in said pair of openings;
    a unitary wedge, having, a wedge portion having a large end and a small end, said wedge portion being of substantially the same shape as said interior of said basket, and having a peripheral groove to receive a wire rope therearound creating, beyond said small end, a live end and a dead end, said wedge portion having an extended portion connected to said small end of said first wedge portion and having a transverse opening therein, said extended portion being sized such that when said wedge is positioned within said basket said extended portion extends beyond said small opening at said second end; and a first wedge retaining means for insertion into said transverse opening in said extended portion, and second retaining means for retaining said wedge retaining means in said opening in said extended portion.

2. A wedge socket assembly as recited in claim 1, wherein said first wedge retaining means and said second retaining means comprise means to connect said dead end of said wire rope to said extended wedge portion.

3. A wedge socket assembly as recited in claim 2, wherein said opening is one of a hole or a notch.

4. The assembly of claim 2 wherein said first wedge retaining means and said second retaining means is a wire rope clip.

* * * * *